Figure 1:
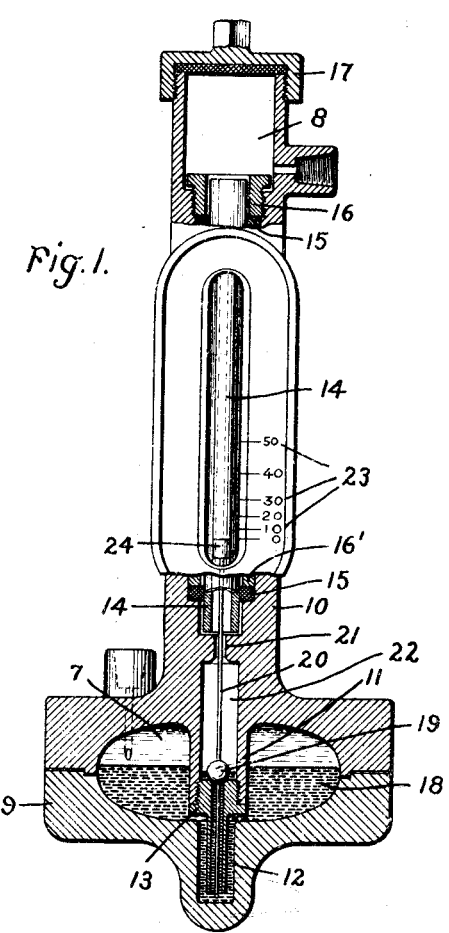

J. WILKINSON.
FLOW METER FOR MARINE PURPOSES.
APPLICATION FILED JUNE 14, 1913.

1,170,205.

Patented Feb. 1, 1916.

Witnesses:
J. Ellis Glen
Anthony Marr

Inventor:
James Wilkinson,
by: Albert Davis
His Attorney.

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

FLOW-METER FOR MARINE PURPOSES.

1,170,205.   Specification of Letters Patent.   Patented Feb. 1, 1916.

Application filed June 14, 1913. Serial No. 773,609.

*To all whom it may concern:*

Be it known that I, JAMES WILKINSON, a citizen of the United States, residing at Schenectady, county of Schenectady, State of New York, have invented certain new and useful Improvements in Flow-Meters for Marine Purposes, of which the following is a specification.

This invention relates to instruments for indicating the rate of flow of a fluid through a conduit, and is especially designed for marine service, the object being to secure accurate readings in spite of the inclination of the meter due to the rolling and pitching of the vessel. In one of the ordinary types of flow meter, a pressure difference device, such as a Venturi or Pitot tube or the like, is inserted in the conduit through which flows the fluid to be metered. The high or leading pressure region of this device is connected with one leg of a U-shaped tube or equivalent structure, and the low or trailing pressure region of said device connects with the other leg of said tube, in which is a mass of mercury, movable to and fro by the variations in pressure. My invention has special reference to this type of indicating instrument. The height of the mercury column in the trailing leg of the meter is due to the difference between the leading and trailing pressures. The column will rise and fall in accordance with the fluctuations in pressure due to variations in fluid flow. If the tube is inclined, the mercury will flow up along it, so as to maintain the same vertical difference in head in the leading and trailing legs of the meter. But this action of the mercury gives false readings, because the upper end of the column advances to higher graduation marks when the tube is inclined, although there may have been no increase in flow. The purpose of my invention is to correct this error, and enable the instrument to give true readings even when inclined. I accomplish this by automatically lowering the level of the mercury surfaces exposed to the leading and trailing pressures, whenever the tube is tilted. In this way, the vertical head of the mercury column is maintained when the tube tilts, but the entire column is lowered so as to keep the upper end of said column at the same graduation mark so long as there is no change in fluid flow. Moreover, when the tube is vertical, a predetermined difference in fluid flow, producing a given change in the leading and trailing pressures, causes the top of the column of mercury to shift a given space in the tube, between two of the graduation marks on the scale. But when the tube is inclined, the vertical height between any two graduation marks becomes less, so that for a given change in fluid flow the top of the mercury column would not coincide with the same mark as when the tube is vertical. My invention provides also for this contingency by automatically decreasing the area of the surface of mercury exposed to the leading pressure, whenever the tube is tilted; the result of which is that for a given increase in the leading pressure a decreased quantity of mercury is forced into the trailing column. This reduced quantity will not give so high a reading as would be the case if the leading surface area had not been reduced when the tube was tilted. By this change in the ratio of the leading and trailing surface areas I thus effect a correction of what would otherwise have been too high a reading of the gauge. I effect this automatic change in ratio of areas by the design of the receptacle for the mercury at the base of the column, said receptacle forming the chamber or leg of the U-shaped tube in which the leading pressure exerts its action. When the instrument is vertical, the area of the mercury in said chamber is greatest, but as the instrument tilts away from the vertical, this area decreases and its surface lowers. The shape of the chamber I prefer is circular in horizontal section and elliptical in vertical section; in other words, an oblate ellipsoid, with its major diameter horizontal. When such a chamber contains mercury the arear of the surface of said mercury is at its maximum when the major axis of said chamber is horizontal. As the chamber is inclined, this area decreases until it reaches a minimum when the minor axis becomes horizontal.

Figure 4:
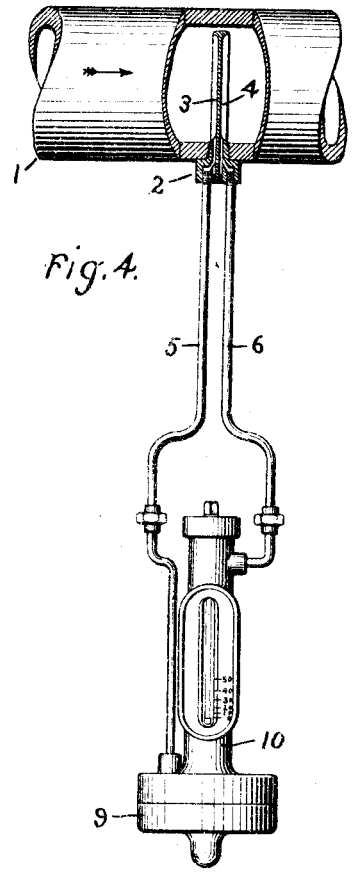
Figure 2:
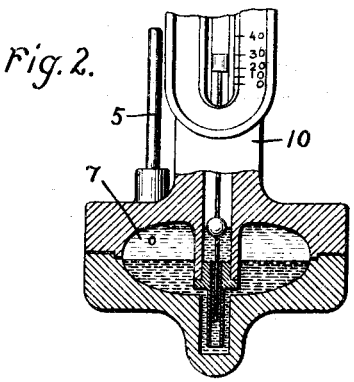
Figure 3:
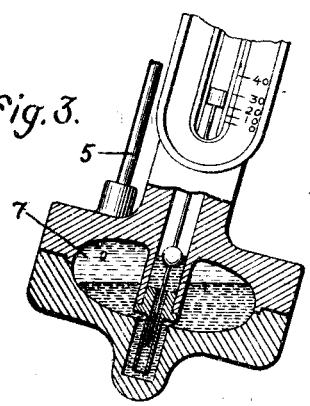

In the accompanying drawing, Figure 1 is a vertical section, partly in elevation of a fluid flow meter embodying my invention, the index standing at zero; Fig. 2 is a similar section of the lower portion of the instrument, showing the position of the index when measuring a flow of 30 pounds of steam per hour; Fig. 3 is a view similar to Fig. 2, showing the instrument tilted, with the index still standing at the 30 pound mark; and Fig. 4 shows how the meter is connected to a steam or other conduit.

The fluid to be measured flows through a conduit 1 in the direction of the arrow. A differential pressure device is inserted in the conduit, preferably a nozzle plug 2 having a long leading face 3 and a long trailing face 4 to obtain the average condition of flow and communicating respectively by pipes 5, 6 with the leading and trailing chambers 7, 8 of the meter. The chamber 7 has the shape of an oblate ellipsoid and is formed in the base 9 of the meter. Rising from said base is a tubular stem 10 whose lower end has a tubular extension 11 depending into the chamber 7. In the bottom of said chamber is a well 12 in line with said extension and receiving a tubular plug 13 screwed into the end of said extension.

In the front of the stem 10 is a longitudinal slot surrounded by a flattened surface provided with graduation marks. Through the slot can be seen a glass tube 14 inclosed in the stem and provided with packing gaskets 15 clamped by a gland 16 and a slotted spacing sleeve 16'. Above the tube is the trailing chamber 8 closed by a packed cap 17. A body of mercury 18 is contained in the chamber 7, and resting upon that portion which lies in the tubular extension 11 is a small float 19. A slender rod 20 is attached to said float and extends up into the glass tube 14 passing through a guiding construction 21 in the bore 22 of the stem just below the tube. By the side of the slot in the stem are graduations 23 indicating preferably pounds of steam per hour, and on the rod 20 is an index 24 which coöperates with said graduations. The instrument may be direct-reading or a constant may be employed. When no fluid is flowing through the conduit the static pressure is the same in both of the chambers 7 and 8, and the mercury 18 stands at the same level in the chamber 7 and the bore 22 of the standard 10, as shown in Fig. 1. But when a flow of fluid occurs, the pressure nozzle plug sets up differential pressures in the chambers 7 and 8, so that the mercury rises in the standard and the float 19 pushes up the index 24 to give the proper reading of the graduations. When the meter is inclined, the surface of the mercury assumes a position more or less oblique to the major axis of the chamber 7, as indicated in Fig. 3. In this position its area is decreased with every departure of the chamber from a horizontal position, owing to its ellipsoidal form, so that the ratio between the areas in the chamber 7 and the bore 22 is similarly decreased. The level of the mercury also falls below what it was when the chamber was horizontal. In order that this drop shall be just sufficient to compensate for the lengthening due to the inclination of the tube, the chamber must be long and shallow, and less than half full of mercury. This shape will also decrease the ratio between the areas of the surfaces exposed to the leading and trailing pressures. If this occurs, the index will always remain opposite the same graduation mark so long as the steam flow is constant, irrespective of the rolling and pitching of the ship.

I have illustrated one form of pressure-difference device, to wit a nozzle plug having longitudinal grooves in its front and rear to set up regions of high and low pressure when fluid flows through the conduit. It is evident that my meter will operate equally well with other well known devices for establishing regions of differential pressure, such as a Venturi tube, a pair of Pitot funnels, a choking washer or a spindle-shaped body in the conduit, and the like.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A fluid flow meter having a fluid containing tube provided with leading and trailing legs, a portion of the leading leg being of such a configuration as to decrease automatically the area of the exposed surface of the mercury in said leg with every departure of said portion from a horizontal position.

2. A fluid flow meter having a fluid containing tube which has a mercury chamber for the leading pressure whose shape is that of an oblate ellipsoid.

3. A steam flow meter having a base containing a chamber, a body of fluid in said chamber, a tubular stem rising from the base and having an extension projecting down into said fluid, a glazed longitudinal slot in said stem, a flat surface on said stem adjacent to said slot and provided with graduation marks, a float in said stem having a rod, an index on the upper end of said rod observable through said slot, and means for connecting said chamber and the upper end of said stem respectively with the high and low pressure regions of a pressure difference device.

4. The combination with a conduit for fluids, of a pressure-difference device thereon, a base containing a chamber connected with the high-pressure region of said device, a longitudinally-slotted tubular stem rising from said base and having an extension depending into said chamber, a chamber at the top of said stem connected with the low pressure region of said pressure difference device, a glass tube in said stem connecting the two chambers, and a float in the stem having a rod whose upper end is observable through said slot.

In witness whereof, I have hereunto set my hand this 12th day of June, 1915.

JAMES WILKIESON.

Witnesses:
 HELEN ORFORD,
 BENJAMIN B. HULL.